United States Patent
Yuasa et al.

(10) Patent No.: US 7,488,170 B2
(45) Date of Patent: *Feb. 10, 2009

(54) METALLIC MOLD FOR OPTICAL ELEMENT AND OPTICAL ELEMENT

(75) Inventors: Seiji Yuasa, Hachioji (JP); Shigeru Hosoe, Hachioji (JP); Yuichi Atarashi, Hachioji (JP)

(73) Assignee: Konica Minolta Opto, Inc. (JP)

( * ) Notice: Subject to any disclaimer, the term of this patent is extended or adjusted under 35 U.S.C. 154(b) by 307 days.

This patent is subject to a terminal disclaimer.

(21) Appl. No.: 11/098,204

(22) Filed: Apr. 4, 2005

(65) Prior Publication Data

US 2005/0226955 A1 Oct. 13, 2005

(30) Foreign Application Priority Data

Apr. 9, 2004 (JP) ............................. 2004-114853

(51) Int. Cl.
B29C 33/00 (2006.01)
B29C 43/32 (2006.01)
(52) U.S. Cl. .................. 425/470; 106/38.27; 249/114.1
(58) Field of Classification Search ................. 977/887; 249/114.1, 134, 135; 425/808, 470; 65/374.11, 65/374.12
See application file for complete search history.

(56) References Cited

U.S. PATENT DOCUMENTS 5,772,905 A * 6/1998 Chou ......................... 216/44
6,009,728 A * 1/2000 Kashiwagi et al. ........ 65/374.11
2004/0211222 A1* 10/2004 Hosoe ...................... 65/374.12
2005/0242454 A1* 11/2005 Yuasa et al. ................. 264/2.5

FOREIGN PATENT DOCUMENTS

WO WO 99/20807 * 4/1999

OTHER PUBLICATIONS

Chiang, Yet-Ming, Physical Ceramics, 1997, John Wiley & Sons, Inc. p. 80.*
Z.P. Lu, Y. Li, S.C. Ng, Reduced glass transition temperature and glass forming ability of bulk glass forming alloys, 2000, Journal of Non-Crystalline Solids, 207, p. 103-114.*
Telford, Mark, The case for bulk metallic glass, Materialtoday, Mar. 2004, p. 36-43.*
Greer, Lindsay A. "Metallic Glasses", Aug. 1997, Solid State & Materials Science, vol. 2, Issue 4, pp. 412-416.*

* cited by examiner

*Primary Examiner*—Yogendra Gupta
*Assistant Examiner*—Emmanuel S Luk
(74) *Attorney, Agent, or Firm*—Cantor Colburn LLP (57) ABSTRACT

A molding die for forming an optical element, comprises a base body; a film layer formed on the base body and having a thickness of 0.01 to 500 μm; and a transferring surface formed on a surface of the film layer by a predetermined process and having a surface roughness Ra of 0.1 to 50 nm. The film layer is formed by an amorphous alloy having a supercooled liquid state containing 20 mol % or more of at least one atom of Pt, Ir, Au, Pd, Ru, Rh, Fe, Co, Ni, Zr, Al, Ti, Cu, W, Mo, Cr, B, and P and the transferring surface maintains the surface roughness after the transferring surface is heated to a temperature which is higher 50° C. higher than the glass transition temperature (Tg) of the optical element formed by the transferring surface and lower than the glass transition temperature of the amorphous alloy.

7 Claims, 4 Drawing Sheets

METALLIC MOLD FOR OPTICAL ELEMENT AND OPTICAL ELEMENT

This application is based on Japanese Patent Application No. 2004-114853 filed on Apr. 9, 2004, in Japanese Patent Office, the entire content of which is hereby incorporated by reference.

BACKGROUND OF THE INVENTION

The present invention relates to a metallic mold for an optical element, which is manufactured by using the amorphous alloy having a supercooled liquid state, and to the optical element.

According to the manufacturing method of a molding die of a plastic optical element which is conventionally generally conducted, a blank (primary product) is manufactured by, for example, steel or stainless steel, and an alloy of an amorphous-like nickel and phosphorous is filmed in the thickness of about 100 μm by a chemical plating, which is called electroless plating, on it, and this plating layer is cutting processed by a diamond tool of an ultra-precise processing machine, and a highly accurate optical surface transfer surface for molding the optical surface of the optical element is obtained.

According to such a method of the conventional technology, because shapes of parts are created basically by the mechanical processing, the part accuracy is easily increased to near the movement accuracy of the processing machine. However, on the other hand, problems are generated in which: the mechanical processing and chemical plating processing are mixed in the manufacturing process and it is vexatiously complicated, and a long period of delivery is necessary; the manufacturing of blank (primary processed goods) is necessary, considering the thickness of plating layer; the plating processing is not always stable, and due to a deviation of composition of the blank or a soiled condition, the adhesion strength of the plating layer is dispersed, or a pinhole-like defect which is called a pit, is generated; and because the creation of the optical surface transfer surface is necessary in the thickness of plating layer, there is a case where there is not any margin in the plating thickness when the optical surface transfer surface is re-worked, and the processing can not be conducted.

Further, according to the conventional technology, it is necessary that the optical surface transfer surface is largely cutting processed by a diamond tool, however, in such a case, the influence such as a condition of a cutting edge of the tool or processing condition, a change of processing environmental temperature is exerted, and there is also a problem that the shape of the optical surface transfer surface finished after cutting processing, is delicately dispersed. This processing dispersion of the optical surface transfer surface is due to the poorness of the machinability of the raw material. In general, the optical surface shape error of about 100 nm is generated, and even in the case where processing is conducted very carefully, the shape error of about 50 nm is remained. This is a limit of processing accuracy when a large amount of optical surface transfer surfaces of the same shape are created.

Further, recently, an optical element in which a ring-shaped zone diffraction groove (ring-shaped diffractive zone) is provided on the optical surface and by which the chromatic aberration is efficiently corrected, is put into practical use in the optical information recording field, and a large amount of optical elements are manufactured. As the optical material, plastic or glass is used, however, in the infrared optical system, a crystal material such as ZnSe is also used. Such an optical element can be produced in a large amount and effectively by molding, however, it is a very important problem, at the time of molding, how high-accurately and effectively minute diffraction grooves on the optical surface of the optical element are manufactured by the metallic mold for optical element.

For example, when minute patterns having the optical function such as the diffraction grooves are created by the diamond cutting on the optical surface transfer surface of the metallic mold for optical element, the sharpness of the cutting edge controls the exactness of the diffraction groove shape, and when it is transferred as the optical surface of the optical element, the diffraction efficiency is largely influenced.

Accordingly, for the purpose that the diffraction efficiency of the ring-shaped diffractive zone is not lowered, it is necessary that the dimension of the cutting edge is made sufficiently small, in such a case, because, on the small cutting edge portion, the cutting resistance is concentrically imposed, it is necessary that the incised amount is decreased, and the number of time of processing is increased until the entire optical surface is uniformly cut and removed. Further, it is necessary that the feed speed of the tool is made slow in order also to prevent the deterioration of the surface roughness of the optical surface by the cutter mark of the small cutting edge, and the optical surface transfer surface processing time per one time also becomes long. As a result, in the cutting processing of the metallic mold for molding the optical element having the diffraction groove, because the cutting length is increased, wearing of the cutting edge of the tool is increased, and the tool change becomes often. That is, when the optical surface transfer surface having minute shape is processed by the conventional diamond cutting, because the life of the tool is very shortened and a time period for processing one optical surface transfer surface is also increased, it is necessary that the tool is changed often, therefore, the processing efficiency is very much lowered, and the productivity of the metallic mold for optical element is lowered, resulting in the rapid increase of the cost. Therefore, particularly, when the optical surface transfer surface having minute shapes on the surface is finished by the diamond cutting, the metallic mold manufacturing method which does not include the electroless nickel plating process, and is simple, and whose delivery date is short, is desired.

In addition to that, recently, it is tried that the minute structure, which is several times smaller or less than the wavelength of the light source to be used, is provided on the optical surface and a new optical function is added to the optical element. For example, the ordinary light converging function by the refraction of the molded lens and a positive dispersion generated as the side reaction at the time are cancelled by using a large negative dispersion by the diffraction obtained when the diffraction groove is provided on the surface of the aspheric surface optical surface, and a method in which the achromatic function, which is originally impossible only by the refraction, is added to a single lens optical element, is put in practice in the objective lens for pick-up apparatus for optical disk, which is DVD/CD compatible. This uses the diffraction action by the diffraction groove whose dimension is several-ten times larger than the wavelength of the light transmitting the optical element, and an area in which the diffraction action by the structure sufficiently larger than the wavelength is managed in this manner is called a scalar area.

On the one hand, it is well known when, in a minute interval which is one several-th of the wavelength of the light transmitting the optical element, protrusions of the conical shape are formed under the crowded condition on the surface of the optical surface, the reflection suppress function of the light can be exhibited. That is, the refractive index change on the border surface between the air and the optical surface when the light wave is incident on the optical element, is not instantly changed from 1 to the refractive index of the medium as in the conventional optical element, but, it is gently changed by the conical shape of protrusions arranged in minute interval, thereby, the reflection of the light can be suppressed. The optical surface on which protrusions like this are formed is a minute structure which is so-called a moth eye, and when the structural bodies which are minuter than the wavelength of the light are arranged in a period shorter than the wavelength, each structure does not diffract any more, and acts on the light wave so as to give an average refractive index. Such an area is generally called an equivalent refractive index area. Relating to such an equivalent refractive index area, for example, it is written in the collected papers C of the Institute of electronic information communication, Vol. J83-C No. 3 pp. 173-181, March 2000.

According to the minute structure of the equivalent refractive index area, a reflection prevention effect larger than the conventional reflection prevention coat can be obtained while the angle dependency or wavelength dependency of the reflection prevention effect is deceased. However, according to plastic molding, because the optical surface and the minute structure are simultaneously created, it is considered that a merit in the production in which the lens function and the reflection prevention function are simultaneously obtained, and the after processing that the reflection prevention coat processing is conducted after the molding as in the conventional one is not necessary, is large, and is remarked. Furthermore, when such a minute structure of an equivalent refractive index area is arranged in such a manner that it has the directionality to the optical surface, the strong optical anisotropy can be given to the optical surface. Therefore, the double refraction optical element, which is conventionally manufactured by cutting the crystal such as quartz crystal, can be obtained by molding. Further, when it is combined with a refraction or reflection optical element, a new optical function can be added to it. The optical anisotropy in this case is called a structural double refraction.

There is a resonance area in which the diffraction efficiency is rapidly changed by a slight difference of the incident condition, between the above-described scalar area and the equivalent refractive index area. For example, when the groove width of the ring-shaped diffractive zone is brought to narrow, a phenomenon (anomaly) that the diffraction efficiency is rapidly decreased or increased at about several-times of the wavelength is generated. When the characteristic of this area is used, a wave-guide mode resonance lattice filter by which only a specific wavelength is reflected, is realized by the minute structure, and the same effect as an ordinary interference filter can be realized by a smaller angle dependency.

Hereupon, when the optical element is formed by using the scalar area, equivalent refractive index area or resonance area, it is necessary to form the minute protrusions (or recesses) on the optical surface. In order to make mass-production of the optical element having such minute protrusions (or recesses), generally, it can be said appropriate that the molding is conducted by using plastic as a raw material. However, in such a case, it is necessary that the optical surface transfer surface provided with the recesses (or protrusions) corresponding to the minute protrusions (or recesses) is provided in the metallic mold for molding of the optical element.

However, relating to the protrusion (or recess) of the equivalent refraction area or resonance area as described above, because it is necessary that protrusions (or recesses) are formed at the interval of several-tens or several-hundreds nm, it is very difficult by the mechanical processing including the cutting processing.

In view of such a problem, in Patent Document 1, the manufacturing method, in which the amorphous alloy having the supercooled liquid state is adhered to the substrate, and by processing such an amorphous alloy, the optical surface transfer surface for molding the optical surface of the optical element is formed, is disclosed. Because the amorphous alloy having such a supercooled liquid state is excellent in the processing easiness, even when it is necessary that the minute structure is formed, for example, on the optical surface transfer surface, it can be easily conducted.

[Patent Document 1] Tokkai No. 2003-160343

Hereupon, in the conventional metallic mold for the optical element, in the case where a temperature range heated when the optical element is molded is not lower than 400° C., there are many cases where the super-hard material or heat resistive material such as SiC is selected as the metallic mold material. However, because the hardness of these materials are hard materials of Hv 1000-3000 in Vickers hardness, when compared to the electroless nickel plating (about Hv 500-600), which is easily cut, they are very difficult in processing, it is difficult to increase the processing shape accuracy or the mirror property of the metallic mold molded transfer surface, or the processing time period more than four times than that of the plating materials is also necessary. As one of its causes, when the super-hard material or material such as SiC is cutting•grinding processed by the diamond tool, because they are hard materials, tool is worn and shape is deformed, there is a case where the cutting amount or cutting flaw•grinding flaw•are changed in the processing, thereby, the shape accuracy or mirror property is largely influenced. Further, also from the point of crystallinity of the material, because, in the material in which SiC, super-hard material or polycrystalline substance is sintered, the grain boundary exists, the material is one which is hardly processed, in contrast to that, there is the difference that the electroless plating is the amorphous uniform film and the material which is easily cut ground.

In contrast to this, as written-in Patent Document 1, when the amorphous alloy having the super-cooling area is adhered to the substrate of the metallic mold for the optical element, the processing easiness can be secured to a certain degree. However, in the Patent Document 1, a specific adhering amount or temperature range is not regulated, and by the content written in the Patent Document 1, it is difficult that the metallic mold for the optical element is actually manufactured.

SUMMARY OF THE INVENTION

In view of such a problem of conventional technology, the present invention is attained and the object of the present invention is to provide a metallic mold for optical element which is excellent for cutting property and which can increase the dimension accuracy of the optical element, and the optical element molded thereby.

The above object can be achieved by the following structures.

(1) A molding die for forming an optical element, comprises:
  a base body;
  a film layer formed on the base body and having a thickness of 0.01 to 500 μm; and
  a transferring surface for transferring and forming an optical surface of the optical element, the transferring surface formed on a surface of the film layer by a predetermined process and having a surface roughness Ra of 0.1 to 50 nm; wherein the film layer is a film layer formed by an amorphous alloy having a supercooled liquid state containing 20 mol % or more of at least one atom of Pt, Ir, Au, Pd, Ru, Rh, Fe, Co, Ni, Zr, Al, Ti, Cu, W, Mo, Cr, B, and P and the transferring surface maintains the surface roughness after the transferring surface is heated to a temperature which is higher 50° C. higher than the glass transition temperature (Tg) of the material of the optical element formed by the transferring surface and lower than the glass transition temperature of the amorphous alloy.

(2) In the above molding die described in (1), when the transferring surface forms the optical element with a plastic material having a glass transition temperature of 200° C. to 250° C., the amorphous alloy is an amorphous alloy having a glass transition temperature of 300° C. or more.

(3) In the above molding die described in (2), the amorphous alloy is $Pd_{40}Cu_{30}Ni_{10}P_{20}$, $Pd_{76}Cu_{18}Si_6$, $Zr_{75}Cu_{19}Al_6$, or $Zr_{55}Cu_{30}Al_{10}Ni_5$.

(4) In the above molding die described in (1), when the transferring surface forms the optical element with a glass material having a low melting point, the amorphous alloy is an amorphous alloy having a glass transition temperature of 300° C. or more.

(5) In the above molding die described in (4), the amorphous alloy is $Pd_{40}Cu_{30}Ni_{10}P_{20}$, $Pd_{76}Cu_{18}Si_6$, $Zr_{75}Cu_{19}Al_6$, or $Zr_{55}Cu_{30}Al_{10}Ni_5$.

(6) In the above molding die described in (1), when the transferring surface forms the optical element with a glass material having a glass transition temperature of 400° C. to 500° C., the amorphous alloy is an amorphous alloy having a glass-transition temperature of 500° C. or more.

(7) In the above molding die described in (6), the amorphous alloy is $Fe_{56}Co_7Ni_7Zr_8Nb_2B_{20}$, $Co_{56}Fe_{14}Zr_{10}B_{20}$, or $Co_{51}Fe_{21}Zr_8B_{20}$.

DETAILED DESCRIPTION OF THE PREFERRED EMBODIMENT

The preferred embodiment of the present invention to attain the above object will be described below.

A metallic mold for optical element written in item 1 is, in a metallic mold for optical element having the molding transfer surface for molding-transferring the optical surface of the optical element, it is characterized in that: on the substrate of the metallic mold for optical element, the film layer of the amorphous alloys having the supercooled liquid state including more than 20 mol % of elements more than at least any one kind of Pt, Ir, Au, Pd, Ru, Rh, Fe, Co, Ni, Zr, Al, Ti, Cu, W, Mo, Cr, B, P, is formed in the thickness of 0.01-500 µm; and when a predetermined processing is conducted on the film layer of the amorphous alloys having the supercooled liquid state, the molding transfer surface is formed; and after the film layer of the amorphous alloys having the supercooled liquid state is heated at the temperature which is more 50° C. higher than the glass transition temperature (Tg) of the material of the optical element molded by the molding transfer surface and which is lower than the glass transition temperature of the film layer of the amorphous alloys having the supercooled liquid state, the surface roughness of the metallic mold molding transfer surface is Ra 0.1-50 nm. Herein, "a predetermined processing" includes the cutting processing, heat-press processing, and combinations of them, however, it is not limited to that.

According to the present invention, when the molding transfer surface is not directly formed on the substrate of the metallic mold for the optical element, and the film layer of the amorphous alloy having the supercooled liquid state which has the heat resistance higher than the glass transition temperature (Tg) of material of the optical element +50° C., and which is excellent for the machinability, is formed on the substrate, in addition to that, compared to the conventional process in which the heat resistant material such as the hard material used for the base material of the metallic mold for the optical element of glass-mold is manufactured by the cutting process, the metallic mold accuracy is increased, or the delivery time period can be reduced, to conduct the minute processing such as the blaze-shaped ring-shaped zone structure on the metallic mold molding transfer surface by the cutting processing, which is conventionally, impossible by the grinding process of the heat resistant material, becomes possible.

For example, when the molding transfer surface of the metallic mold for optical element is formed in the super-hard raw material in the grinding process, the about 100 nm error is generated to the required shape, in contrast to that, when the amorphous alloy having the supercooled liquid state is finished in the cutting process, the shape error is in an amount not larger than 50 nm. Further, also for the manufacturing delivery time of molding transfer surface, when the super-hard material is finished in the grinding process, average 8 hours are necessary per one, in contrast to that, when the amorphous alloy having the supercooled liquid state having the good cutting property is used, it can be finished for average one hour. This difference of the processing time and the shape accuracy is mainly due to the crystal structure of both raw materials. Because the super-hard raw material is a poly-crystal, and as the manufacturing method, because it is the crystal in which the minute particles of the poly-crystal are burned and hardened, how much the minute particles are made fine, because the grain boundary of its minute particle order exists, the cutting quality at the time of processing is different in each local portion of micron order, and the processing accuracy is not increased, and the processing time is also extended. On the one hand, because the amorphous alloy having the supercooled liquid state is a uniform amorphous layer, theoretically the grain boundary does not exist, and a smooth mirror surface can be finished. In this manner, a reason that the amorphous alloy having the supercooled liquid state is easily processed, is a factor of advantages that the delivery time of the metallic mold for optical element is shortened and the shape accuracy is increased.

In addition to such an advantage of manufacturing of the metallic mold for optical element, in the molding transfer surface, the film layer of the amorphous alloy having the heat-resistance by which the surface roughness Ra 0.01-50 nm can be kept under the higher temperature than the glass transfer point (Tg)+50° C., is formed, and because, generally, the amorphous alloy has the high corrosion resistance and is chemically stable material, it is hardly fused with the optical element material, and the life of metallic mold can be extended. In this manner, by the new metallic mold for the optical element having the machinability and the heat resistance, the creation of the molding transfer surface having the minute structure which is impossible by the conventional metallic mold for the optical element created by grinding the heat resistive material, such as the metallic mold for glass mold in which, particularly, the temperature region to be used is higher than 400° C., becomes possible.

Herein, the amorphous alloy having the supercooled liquid state, so-called metallic glass will be described. This is a material structured by the amorphous-like alloy material which becomes the super-cooling liquid when heated. In contrast to that ordinary metal is poly-crystal structure, this material has the characteristic which ordinary metals does not have, and in which, because the structure is amorphous-like, the composition is microscopically uniform, and is excellent in the mechanical strength or the normal temperature chemical resistance, and has the glass transition temperature, and when heated in the range (ordinarily, about glass transition temperature+10-100° C.) of glass transition temperature—crystallization temperature which is the supercooled liquid state, because it is softened into glass-like (it becomes the viscous fluid), the press molding processing can be conducted. Further, it is found that, also in the cutting processing, as described above, when the super-precise cutting processing by, particularly, the diamond tool is conducted, the highly accurate mirror surface can be easily obtained. The reason is considered that, because this material is amorphous-like and has no grain boundary, the machinability is uniform without depending on the location, or because, in order to keep the amorphous-like, the crystallization energy is increased and it is made into the poly-crystal in the composition, the diffusion wearing of the diamond tool is small during the cutting processing and the life of tool cutting edge can be kept long. As a bulk material in which the optical surface transfer surface can be practically created by the super-precise cutting processing, only a soft metal is conventionally known, and the high hardness material such as silicon or glass can be cutting processed only by ductile mode cutting by very minute notching amount (about 100 nm), however, it is very low efficiency. Accordingly, it can be said that it is a discover suggesting the very large application development for the optical surface creation processing centering the metallic mold, that the amorphous alloy is used for the metallic mold material. The similar processing characteristic appears in the form that the large grinding ratio can be obtained also for the grinding processing using the diamond stone.

As the metallic mold material for plastic optical element molding, because the resin temperature is nearly 300° C., Pd series, Ti series, Fe series are advantageous because they have high glass transition temperature, however, more preferably, Pd series is advantageous also in a point that it is slightly oxidized in the air, and the heat pressing can be conducted. In this case, although Pd (palladium) is a precious metal and cost is high, the metallic mold for the optical element obtained by the manufacturing method of the present invention can also re-form the different pattern when the adhered amorphous alloy is heated at need.

The metallic mold for the optical element written in item 2 is characterized in that: in the invention written in Item 1, the film hardness of the film layer of the amorphous alloys having the supercooled liquid state is Hv 100-3000 in the Vickers hardness. According to the present invention, because the hardness of the film layer of the amorphous alloys having the supercooled liquid state can be selected widely, the composition can be changed corresponding to the purpose of use, and the hardness can be changed. When the hardness is not larger than Hv 800, the cutting is easy, and the cutting process for optical purpose can be greatly shortened. Further, when the hardness is not smaller than Hv 1500, even when the pressure stronger than 3000 kg/cm$^2$ is impressed, there is an effect that the shape of the molding transfer surface is not collapsed, and the life of metallic mold is extended. Because the hardness of about Hv 800-1500 has the both advantages, it can be said that that hardness is easiest for the use.

Because the metallic mold for the optical element written in item 3 is characterized in that: in the invention written in item 1 or 2, the ring-shaped structure around the optical axis is formed on the optical surface of the optical element molded by the metallic mold for the optical element, the function of the optical element molded by the metallic mold for the optical element manufactured by the above manufacturing method can be more heightened.

Because the metallic mold for the optical element written in item 4 is characterized in that, in the invention written in item 3, the ring-shaped zone structure is an optical path difference addition structure, a function of the optical element molded by the metallic mold for the optical element manufactured by the above manufacturing method can be more heightened. As the optical path difference addition structure, so-called NPS (Non-Periodic Surface) structure is well known.

Because the metallic mold for the optical element written in item 5 is characterized in that, in the invention written in item 3, the ring-shaped zone structure is a blaze type diffractive structure whose cross section in the optical axis direction is saw-tooth-like, a function of the optical element molded by the metallic mold for the optical element manufactured by the above manufacturing method can be more heightened.

Because the metallic mold for the optical element written in item 6 is characterized in that, in the invention written in item 3, the ring-shaped zone structure is a diffractive structure whose cross section in the optical axis direction is step-like, a function of the optical element molded by the metallic mold for the optical element manufactured by the above manufacturing method can be more heightened. As the step-like diffractive structure, DOE is well known.

Because the metallic mold for the optical element written in item 7 is characterized in that, in the invention written in any one of items 3-6, the ring-shaped zone structure has a function to correct the aberration change of the optical element due to the wavelength change of the light source which irradiates the light to the optical element, the optical element adequate for the optical pick-up apparatus by which the recording and/or reproducing of the information is conducted on, for example, an optical disk, can be provided.

Because the metallic mold for the optical element written in item 8 is characterized in that, in the invention written in any one of items 3-7, the ring-shaped zone structure has a function to correct the aberration change due to the temperature change of the optical element, the optical element adequate for the optical pick-up apparatus by which the recording and/or reproducing of the information is conducted on, for example, an optical disk, can be provided.

Because the metallic mold for the optical element written in item 9 is characterized in that: in the invention written in item 2, on the molding transfer surface of the metallic mold for the optical element, corresponding recesses or protrusions are formed so that a plurality of protrusions or recesses are transfer-molded on the optical surface of the optical element molded by the metallic mold for the optical element, a function of the optical element molded by the metallic mold for the optical element manufactured by the above manufacturing method can be more heightened. Further, even when it is necessary that protrusions or recesses are arranged at an interval of several tens to several hundreds nm, the mechanical processing is not necessary and they can be easily formed by transfer-molding. Hereupon, "recesses or protrusions" also include those in which the recesses and protrusions are mixed.

The metallic mold for the optical element written in item 10 is characterized in that: in the invention written in item 9, protrusions or recesses of the optical surface of the optical element form the minute structure of the equivalent refractive index area. Hereupon, it is preferable when an interval of the protrusions or recesses is not larger than wavelength of the light transmitting the optical surface of the optical element.

The metallic mold for the optical element written in item 11 is characterized in that: in the invention written in item 9 or 10, protrusions or recesses of the optical surface of the optical element form the minute structure generating the reflection prevention effect. Hereupon, it is preferable when an interval of the protrusions or recesses is not larger than wavelength of the light transmitting the optical surface of the optical element.

The metallic mold for the optical element written in item 12 is characterized in that: in the invention written in any one of items 9-11, the protrusions or recesses of the optical surface of the optical element form the minute structure generating the structure double refraction. Hereupon, it is preferable when an interval of the protrusions or recesses is not larger than wavelength of the light transmitting the optical surface of the optical element.

The metallic mold for the optical element written in item 13 is characterized in that: in the invention written in any one of items 9-12, the protrusions or recesses of the optical surface of the optical element form the minute structure of the resonance area. Hereupon, it is preferable when an interval of the protrusions or recesses is not larger than wavelength of the light transmitting the optical surface of the optical element.

The metallic mold for the optical element written in item 14 is characterized in that: in the invention written in any one of items 9-13, the protrusions or recesses of the optical surface of the optical element exist in a part of the optical surface, and the corresponding recesses or protrusions exist in a part of the molding transfer surface so that the optical surface is transfer-formed.

The metallic mold for the optical element written in item 15 is characterized in that: in the invention written in any one of items 9-14, the protrusions or recesses having at least a plurality of shapes or arrangement patterns exist in a part of the optical surface of the optical element, and the corresponding recesses or protrusions having at least a plurality of shapes or arrangement patterns exist in a part of the optical surface transfer surface so that the optical surface is transfer-formed.

When, on the optical surface of the optical element, protrusions or recesses of the minute structure are formed so that they have a plurality of shapes or arrangement patterns, and they are partially arranged on the optical surface, the optical surface can locally exhibit optical functions of those minute structures. Hereby, on the light flux passing the optical surface, optical functions generated by each of shapes or arrangement patterns of protrusions or recesses of minute structure are partially or selectively conducted, and a plurality of optical functions can be incorporated in one light flux. In this case, on the optical surface of the optical element, it is not necessary that protrusions or recesses of the minute structure positively exist on the entire surface of the optical surface. That is, conventionally, although, in order to exhibit a predetermined optical function, it is necessary that a plurality of optical elements are combined, when the optical element molded by the metallic mold for the optical element manufactured by the manufacturing method of the present invention, is used, because a predetermined optical function can be exhibited independently, the optical system can be more simplified, and the large cost reduction can be realized. Further, by the metallic mold for the optical element manufactured by the manufacturing method of the present invention, mass-production of such an optical element can be easily conducted.

Because the metallic mold for the optical element written in item 16 is characterized in that: in the invention written in any one of items 1-15, the film layer of the amorphous alloy having the supercooled liquid state is formed on the substrate by the spatter processing, the strong adhesion can be realized.

Because the metallic mold for the optical element written in item 17 is characterized in that: in the invention written in any one of items 1-15, the film layer of the amorphous alloy having the supercooled liquid state is formed on the substrate by the ion-plating processing, the strong adhesion can be realized.

Because the metallic mold for the optical element written in item 18 is characterized in that: in the invention written in any one of items 1-15, the film layer of the amorphous alloy having the supercooled liquid state is formed on the substrate by the vacuum evaporation, the strong adhesion can be realized.

Because the metallic mold for the optical element written in item 18 is characterized in that: in the invention written in any one of items 1-15, the film layer of the amorphous alloy having the supercooled liquid state is formed on the substrate by the CVD processing, the strong adhesion can be realized.

The optical element written in item 20 is characterized in that it is molded by using the metallic mold for the optical element written in any one of items 1-19.

The optical element written in item 21 is characterized in that, in the invention written in item 20, the optical element uses plastic material as a raw material.

The optical element written in item 22 is characterized in that, in the invention written in item 20, the optical element uses glass material as a raw material.

The optical element written in item 23 is characterized in that, in the invention written in any one of item 20-22, the optical element is a lens.

The diffractive structure (ring-shaped diffractive zone) used in the present specification, indicates the diffraction surface in which a relief formed as the about concentric ring-shaped zone around the optical axis is provided on the surface of the optical surface of the optical element (for example, lens), and to which an action to light converge or diverge the light flux by the diffraction is given. For example, when the cross section is viewed on the plane including the optical axis, it is well known that each ring-shaped zone has a saw-toothed shape, and includes such a shape. The ring-shaped diffractive zone is called also the diffraction groove.

In the case where the present invention is applied, the shape of each of minute structures or the arrangement periods such as the ring-shaped zones or the alignment of protrusions (or recesses) are not related. How minute structure it is, when it is made for the purpose to add a new function to the optical element, the metallic mold for the optical element or the optical element molded thereby, is included in the category of the present invention. Further, as the function to be newly added, it is not limited to the function by which the aberration is reduced. As long as it is conducted for the purpose to be brought into finally an ideal aberration, a case where the aberration is intentionally increased corresponding to the characteristic of the optical system is also included in the category of the present invention.

According to the present invention, although it is low cost and the operation is easy, the metallic mold for the optical element which is excellent for the cutting property and by which the dimension accuracy can be increased, and the optical element molded thereby, can be provided.

Figure 1:
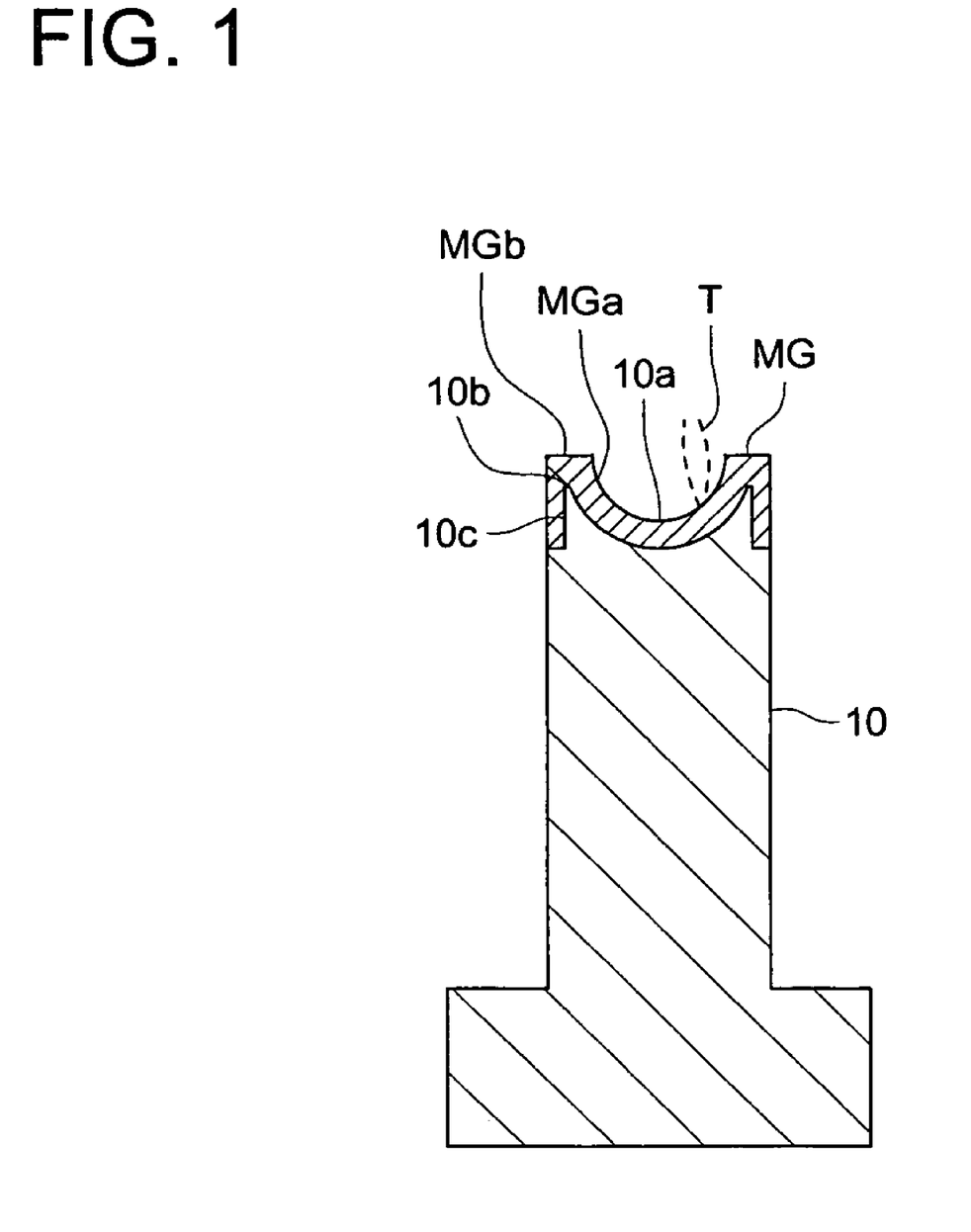
FIG. 1 is a view showing a manufacturing process of a metallic mold for optical element.

Referring to the drawings, the embodiment of the present invention will be described below. FIG. 1 is a view showing a manufacturing process of a metallic mold for an optical element. Initially, a substrate 10 is formed from a stainless steel. a material of the substrate 10 is not particularly limited, but it is preferable that it is a commonly used metallic mold material such as steel or stainless steel, and in that case, there is an advantage that the supply is stable and the price is low. The substrate 10 as a blank corresponds to the optical surface (for example, aspheric surface) of the optical element on one end (upper end in the view), however, when the concave portion (base surface) whose curvature is larger than that, or equal to that, and the peripheral surface 10b of that periphery are formed, the substrate 10 has the approximate shape of the metallic mold. The shape accuracy of the concave portion 10a and peripheral surface 10b, and the end portion peripheral surface 10c of the substrate 10 is, although it depends on the film thickness, provided on the surface, of the amorphous alloy having the supercooled liquid state (hereinafter, simply called amorphous alloy) MG, when the amorphous alloy MG of about 100 μm is film-formed, because the accuracy of about 10-20 μm is enough, the blank processing itself is a processing which can be conducted by using an NC lathe for several tens minutes. To this concave portion 10a and peripheral surface 10b, and further, to the end portion peripheral surface 10c of the substrate 10, the amorphous alloy having the supercooled liquid state MG is adhered in the following manner.

Film of the amorphous alloy MG is formed on the surface of the concave portion 10a and peripheral surface 10b, and the end portion peripheral surface 10c of the substrate 10, detail of which will be described later, by PVC processing such as spattering or vacuum evaporation or CVD processing. Hereupon, in the present embodiment, other than the concave portion 10a, also on the peripheral surface 10b, end portion peripheral surface 10c, the film of the amorphous alloy MG is formed, however, the film of the amorphous alloy MG may be formed only on the concave portion 10a.

Hereupon, in the above embodiment, an example in which the base surface of the substrate 10 has the concave shape, is shown, and in such a case, the curvature of the base surface is larger than that of finally formed molding transfer surface, or the shape of the curvature equal to that, however, in the case of an example in which the base surface of the substrate 10 is convex shape, when the curvature of the base surface is made smaller than that of finally formed molding transfer surface, or is made the shape of the curvature equal to that, the same effect can be obtained.

The film formation of the amorphous alloy MG is, in CVD processing, the substrate 10 becomes high temperature, and it is disadvantageous in the characteristic of the amorphous alloy which is in the super-cooling liquid state, however, the present invention is not limited to either one of CVD processing or PVD processing. In PVD processing by which the film of the amorphous alloy MG is comparatively easily formed, there is processing such as spattering or ion-plating, vacuum evaporation, and herein, any processing may be used. In this connection, in the spattering method, the target material may not be always amorphous state, and when the constitutive atom is adhered in a desired composition ratio to the substrate 10, in the principle of the spattering, because the rapid cooling follows at the time of adhering, it can easily film-formed in the amorphous state. The film formation speed is about 0.2— several μm/h, and it can be easily shortened when the output of the spattering apparatus is increased, however, because the temperature of the substrate 10 rises and the amorphous condition is not kept, the cooling of the substrate by the water-cooling is necessary. Even when the film thickness is so much thick, because the much machining allowance is remained in the diamond cutting processing or heat press molding after this, and the efficiency is poor, normally, about 100 μm is more preferable. However, in the complicated shape, there is also a case where the film thickness of several mm is necessary, and a range from about 10 nm to 1 mm is a practical range of the film thickness.

In the cases where particularly the film thickness is large, there is a case where the design shape is destroyed by the amorphous alloy protruded to the portion other than the concave portion 10a and the peripheral surface 10b, and end portion peripheral surface 10c of the substrate 10. Therefore, there is a case where it is necessary that the masking is conducted on a portion other than the film formation portion, or a protruded portion is removed by the diamond cutting or grinding processing after the film formation. However, because the amorphous alloy MG has the good machinability and small removed amount, there is almost not a burden of the processing man-hour or the cost.

When, as in the present embodiment, a small amount of the amorphous alloy MG is used for only the limited part of the metallic mold for the optical element in this manner, also for the amorphous alloy of the kind in which, conventionally, although it has an excellent physical characteristic, the manufacture of the bulk shape is difficult, it becomes possible to be applied for the metallic mold for the optical element. For example, for the high hardness amorphous-alloy such as nickel series or copper series, the high durability can be expected as the metallic mold material, however, because it can hardly be made bulk-like, by the method of the preceding application, the application to the metallic mold for the optical element is difficult, however, when it is made into film formation as in the present embodiment, the application becomes possible. Further, in the bulk material, because gas such as hydrogen exists in the bare metal at the time of the metallurgy, the minute hole called "cavity" exists, and when the diamond cutting or heat press molding is conducted, it appear on the processed and formed optical surface and there is a case where the surface poorness is generated. However, when the film formation is made from the gaseous phase by the CVD processing or PVD processing as in the present embodiment, because there is almost not a case of the generation of "cavity", the manufacturing yield of the metallic mold for the optical element can be maintained high, and because, for example, the manufacture of a spare corresponding to the poorness is not necessary, when compared to the metallic mold for the optical element disclosed in the preceding application, the large cost reduction is attained.

Subsequently, when the diamond cutting processing or heat press molding or the combination of them is conducted on the film formation of this amorphous alloy MG, the surface of the amorphous alloy MG is finished into a desired optical surface transfer surface MGa (corresponding to the concave portion 10a of the substrate 10) and geometrical dimension reference surface transfer surface MGb (corresponding to the peripheral surface 10b of the substrate 10). According to the present embodiment, in the case where the curvature of the concave portion 10a is previously formed in the shape whose curvature is larger than the curvature of the molding transfer surface of the finally formed metallic mold for the optical surface or in equal shape, when the accumulation is conducted to an extent that the surface shape of the film MG almost coincides with the molding transfer surface shape, there is a merit that, even a part whose film thickness is thinnest, the enough film thickness is obtained in the after-processing, and the diamond cutting processing or heat press molding can be appropriately conducted.

Because the diamond cutting is a processing in which, by using a single crystal diamond tool T as shown by a dotted line in FIG. 1, the cutting processing is conducted one by one by the super-precise lathe (not shown), it passes though basically the same processing process as the metallic mold manufacturing method by the conventional electroless nickel plating, however, as compared to the conventional one, it can be said that it is more excellent feature that the optical surface transfer surface MGa and geometric dimension reference surface transfer surface MGb are quickly and minutely formed by the PVD processing or CVD processing, and because the chemical plating processing is not conducted, there is no defect such as a pin-hole, and a processing delivery time is short, and because the machinability is very good, the tool wearing is small, and the shape creation by the cutting processing is easy.

Figure 2:
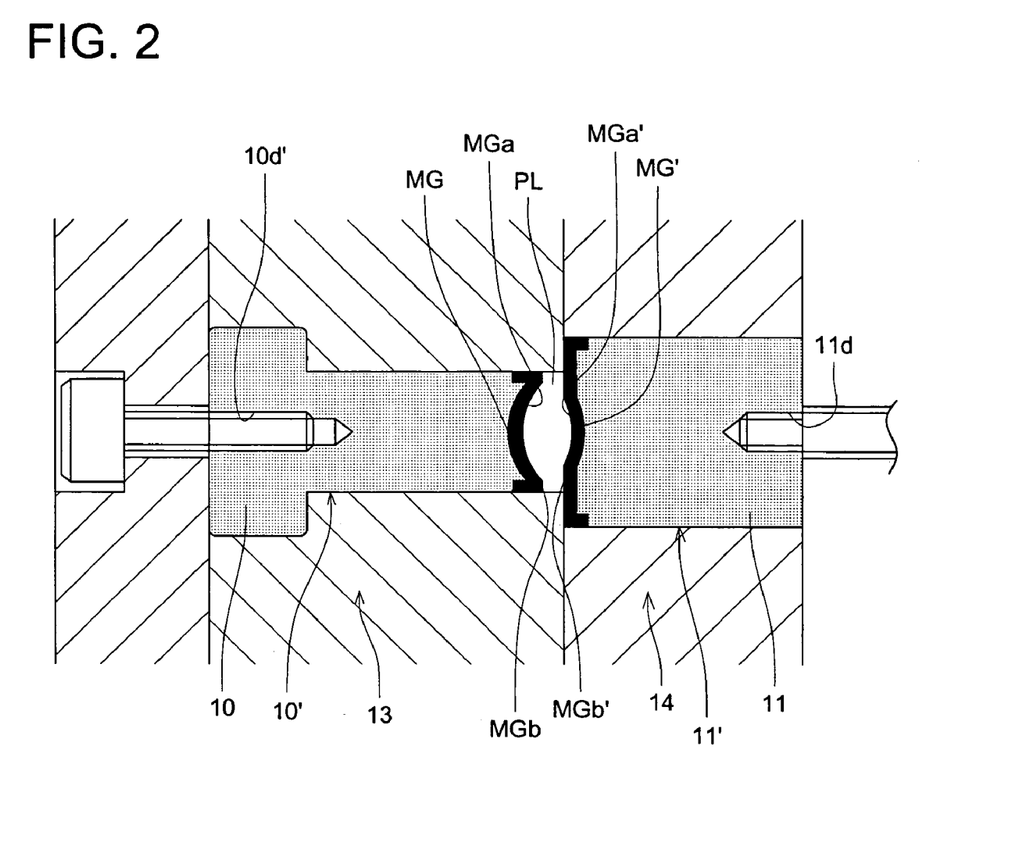
FIG. 2 is a sectional view of a die-set including the metallic mold for optical element for forming a lens which is the optical element.

FIG. 2 is a sectional view of a die-set including the metallic mold for the optical element for forming a lens which is an example of the optical element. In the manner as described above, the metallic mold for the optical element 10' on which the amorphous alloy MG is film-formed, and in the same manner, the metallic mold for the optical element 11' on which the amorphous alloy MG' is film-formed are inserted into the die-set metallic molds 13, 14 in such a manner so that mutual optical surface transfer surfaces MGa, MGa' and mutual geometric dimension reference surface transfer surfaces MGb, MGb' are faced, and melted plastic material PL is injected between metallic molds for the optical element 10', 11' from the gate, not shown, in the same manner as the ordinary injection molding, and by further cooling it, a desired shape lens can be obtained. Hereupon, also when screw holes 10d', 11d for die-set attaching are processed, different from the amorphous alloy MG, because, on the substrates 10, 11 having the excellent toughness, drilling is conducted and tap-hole cutting may be conducted, the breakage at the time of processing can be suppressed, further, because also for the external force at the time of molding, it has a function that the substrates 10, 11 are bent, and the stress concentration is softened, the breakage is suppressed.

FIG. 3 is a perspective view enlargedly showing an example of the optical surface of a lens formed by such a metallic mold for the optical element. In FIG. 3(a), a structure (an example of the minute structure of the equivalent refractive index area) in which, on the optical surface of the lens, minute cylinders C as an example of a plurality of protrusions are formed matrix-like numerously, is shown. For example, when such an objective lens is used as the objective lens of the optical pick-up apparatus for DVD recording/reproducing, the light transmitting the lens is in the vicinity of 650 nm. Accordingly, when the interval Δ of the minute cylinders C is 160 nm, the light incident on such an objective lens is almost not reflected, and the objective lens having the very high light transmission can be provided.

Figure 3A:
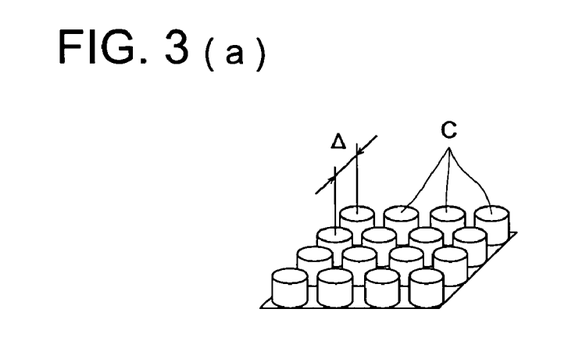
FIG. 3 is a perspective view enlargedly showing the optical surface of the lens formed by the metallic mold for optical element.
Figure 3B:
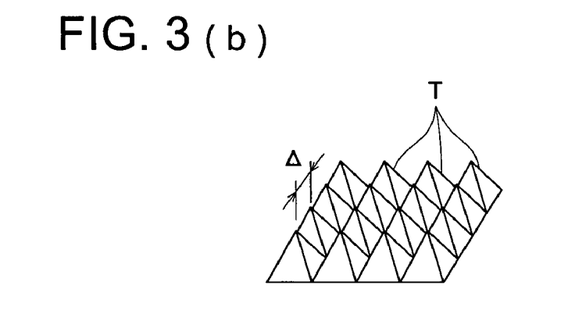
Figure 3C:
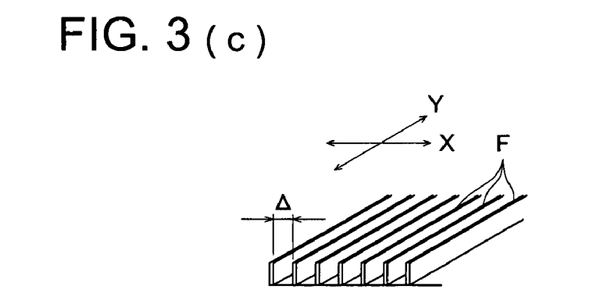
Figure 3D:
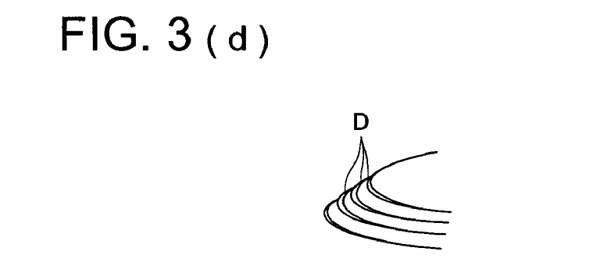

In FIG. 3(b), on the optical surface of the lens, a many number of minute triangular pyramids T separated by interval Δ are formed as an example of a plurality of protrusions, and has the same prominent effect as in FIG. 3(a). As this interval Δ, when it is not larger than 0.1-0.2 μm, it is preferable because the scattering is lowered. In FIG. 3(c), on the optical surface of the lens, a great number of fins F (an example of minute structure of the structure double refraction) separated by the interval Δ are formed as an example of a plurality of protrusions. The length of fin F is longer than the wavelength of the transmitting light (in the above example, more than 650 nm). The lens provided with such a structure has a so-called polarizing effect in which the lens transmits the light having the oscillation surface in the direction along the fin F, but the light crossing the fin F is not transmitted. In FIG. 3(d), on the optical surface of the lens, as an example of the ring-shaped zone structure around the optical axis, the blaze type ring-shaped diffractive zone D whose cross section in the optical direction is saw-toothed-like, is formed. Relating to the ring-shaped diffractive zone, because the chromatic aberration correction and temperature correction which are effects corresponding to its shape, are detailed in, for example, Tokkai No. 2001-195769, the explanation hereinafter will be omitted. As the ring-shaped zone structure other than this, NPS, DOE can be formed. Further, in FIGS. 3(a)-(c), for simplification, on the plane, an example in which those protrusions are provided, is shown, however, its bottom surface is formed as a curved surface having an appropriate curvature such as spherical surface or aspheric surface, and they may also be provided on the curved surface.

(Manufacturing Method of the Conventional Metallic Mold for the Optical Element)

The base material of the metallic mold for the optical element is required to change the raw material corresponding to the using temperature range (the temperature range for molding the optical element, it is the same hereinafter). When the using temperature range is 100° C.-300° C., it is preferable when the material in which iron is included in the main component, and which can be easily cut, is used. In this case, as a merit, the material cost is low, and the material preparing time or processing process can be shortened. On the one hand, when the using temperature range is higher than 300° C. and lower than 800° C., for the base material of the metallic mold for the optical element, it is preferable when the heat resistant material such as super-hard material or SiC is used. However, as a demerit, a problem that the material cost is high, and the material preparing time is prolonged (about 1 month and half), and because the base material is hard and processing is hardly conducted, the processing process is prolonged, is remained.

When the material in which iron is included in a main component and which can be easily cut, is used in the using temperature range 100-300° C., for the purpose of manufacturing the metallic mold for the optical element, initially, a blank metallic mold is manufactured by cutting •grinding. In this case, the shape of the base surface of the blank metallic mold (the surface forming the molding transfer surface) is manufactured in such a manner that the curvature is about several tens μm smaller than that of the molding transfer surface to be finally obtained. Conventionally, as the molding transfer surface material in the metallic mold, in many cases, the electroless nickel plating material is used. The film of electroless nickel plating is formed on the whole of the blank metallic mold in a degree of about 100 μm. The electroless nickel plating is not related to the shape of filmed bare material, and the film grows in the direction perpendicular to the surface. Then, on the base surface, the surface whose curvature is several tens μm larger than that of the shape of the molding transfer surface to be finally obtained, is formed.

In the blank metallic mold for which electroless nickel plating process is completed, the processing of the outer peripheral portion and end surface portion, excepting the metallic mold molding transfer surface, is conducted by the cutting using the diamond tool, and by the grinding process using the diamond tool. In this case, the processing accuracy of the outer peripheral portion is not larger than the shape accuracy 2 μm, and the surface roughness is not larger than 100 nm. After the completion of this outer peripheral portion processing process, the processing of the molding transfer surface is conducted. The molding transfer surface is cut by using the diamond tool, and the shape of the metallic mold transfer surface optical surface is obtained. Necessary shape accuracy is not larger than 50 nm, and the surface roughness is not larger than Ra 5 nm. The above description is the manufacturing method of the conventional metallic mold for the optical purpose, when the using temperature range is 100° C.-300° C.

In contrast to this, when the using temperature range is 300-800° C., because the temperature range in which the metallic mold for the optical element is exposed, is high, and the easily cut electroless nickel plating generates the crystallization, it can not be used, further, because iron series base material is also very strongly oxidized, there is a problem that it can not be used. Therefore, as the base material of the metallic mold for the optical element which can bear this temperature range, a general heat resistant base material such as super-hard material or SiC is prepared. Such a material has the heat resistive performance, however, because it is hard like as Hv 1000-3000 in the Vickers hardness, and the using temperature is high, the film formation of the function film such as protective coat after processing, is necessary.

Initially, the blank metallic mold is manufactured from the base material by the grinding processing. As a grinding stone, a diamond stone is used. After that, the finishing processing is directly conducted on the base material. As the processing method, the cutting•grinding process using the diamond tool is well known. It is finished so that the error of the shape for which the molding transfer surface is required is in ±100 nm. Because the base material is a hard material whose hardness is Hv 1000-3000, during cutting•grinding process, the diamond tool is worn, and a large dislocation is easily generated from the shape to be obtained. Further, because the material is hard, a long period of time is necessary for the processing. After that, if necessary, via a correction grinding process for shaving the amount of the shape error, the shape of the molding transfer surface of the metallic mold for the optical element is completed. When it is used as the metallic mold for the optical element as it is, it is well known that the surface chapping due to the fusion to the optical raw material or the oxidation of the base material is generated, and because it can not be used as it is, the function film of about 0.1-0.5 μm for the prevention of the fusion to the optical raw material, and the deterioration•deformation of the molding transfer surface is formed, and the metallic mold for the optical element is completed. Generally, as the function film, a large number of films like as a precious metal film such as Pt, Ir, a carbon film such as the diamond like carbon, transition metal film such as Cr, other than those, oxide film, nitride film, are well known.

(Manufacturing Method of the Metallic Mold for the Optical Element According to the Present Invention)

In the manufacturing method according to the present invention, even in any using temperature range, there is no large difference in the process, the blank metallic mold material may be selected corresponding to the using temperature, and the composition of the amorphous alloy having the supercooled liquid state may be changed corresponding to the temperature range. For example, in the case of the metallic mold for the optical element for molding the plastic lens material whose using temperature range is in the vicinity of 200-250° C., the material whose glass transition temperature Tg is more than 300° C., may be selected, and as such a material, it corresponds to $Pd_{40}Cu_{30}Ni_{10}P_{20}$ (Tg=300° C.), $Pd_{76}Cu_{18}Si_{6}$ (Tg=350° C.), $Zr_{75}Cu_{19}Al_{6}$ (Tg=404° C.), or $Zr_{55}Cu_{30}Al_{10}Ni_{5}$ (Tg=418° C.) Further, when the transferring surface forms the optical element with a glass material having a low melting point such as K-PG325 (Tg=288° C.) and K-PG375 (Tg=344° C.), above amorphous alloys may be selected as the material of the molding transfer surface of the metallic mold. On the one hand, in the case of the metallic mold for the optical element for molding the glass material whose using temperature range is 400° C.-500° C., the metal glass material whose glass transition temperature Tg is 500-600° C. may be selected, and as such a material, it corresponds to $Fe_{56}Co_{7}Ni_{7}Zr_{8}Nb_{2}B_{20}$ (Tg=550° C.), however, it is not necessary that the manufacturing method and process are largely changed due to the difference of the material. Therefore, as the material of the molding transfer surface of the metallic mold, another amorphous alloy having a high glass transition temperature such as $Co_{56}Fe_{14}Zr_{10}B_{20}$ (Tg=537° C.), or $Co_{51}Fe_{21}Zr_{8}B_{20}$ (Tg=527° C), Ni-based amorphous alloy, or an amorphous alloy containing a precious metal such as Pt and Ir having a good releasing property for optical grass may be used. Since the glass transition temperature of an amorphous alloy may be varied depending on its composition, if an amorphous alloy is selected so as to have a glass transition temperature falling in a temperature range determined based on the glass transition temperature of an optical material according to the present invention and is used as the material of the molding transfer surface of the metallic mold, an optical surface can be transferred from the molding transfer surface to the optical material stably. Whereby, there may be no problem that the molding transfer surface of the metallic mold is crystallized and the surface roughness is deteriorated.

Initially, the blank metallic mold is manufactured from the base material. Its process is not different from the above conventional manufacturing method. When the using temperature range is lower than 300° C., the base material of Fe series, when it is higher than 300° C., the base material of the super-hard material or SiC is processed, and the blank metallic mold is manufactured. The point largely different from the above conventional metallic mold manufacturing method, is the process by which the molding transfer surface is manufactured, and the film layer of thickness 0.01-500 μm of the amorphous alloy (metal glass) having the supercooled liquid state is formed on the molding transfer surface of the blank metallic mold. Herein, an example of formation of the metal glass film layer by the spattering method is shown. A necessary one for the spattering method, is a target, and it is not necessary that the target is the metal glass of the amorphous structure, and it is allowable when the target has the same composition rate as that of desired metal glass.

(Film Formation Method of the Metal Glass)

Figure 4:
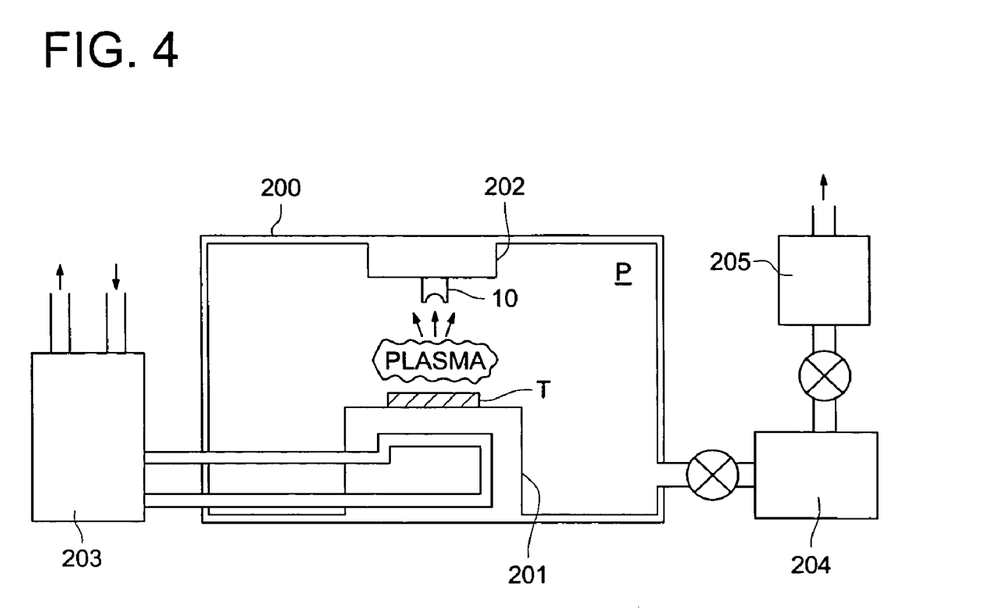
FIG. 4 is an outline view showing a film forming apparatus of metallic glass.

FIG. 4 is an outline view showing a film formation apparatus of the metal glass. In FIG. 4, in a processing room P covered by a casing 200, a target supporting table 201 for supporting a target T is placed, and a sample holder 202 for holding the substrate 10 of the metallic mold is arranged in such a manner that the base surface corresponds to the target supporting table 201. A cooling pipe is formed inside the target supporting table 201, and in such a cooling pipe, through the external control apparatus 203, the cooling water for the temperature adjustment can be circulated.

Further, the processing room P is connected to a turbo molecular pump 204 through a valve V1, and the turbo molecular pump 204 is connected to a rotary pump 205 through a valve V2. Inside of the processing room P is sucked by 2 pumps 204, 205, and is filled with Ar atmosphere whose pressure is about $10^{-1}$—several Pas.

Next, the film formation method of the metal glass will be described. Initially, the target T of the same composition rate as the metal glass to form the film layer is prepared. Herein, the base material of necessary composition rate is prepared, and the base material is melt by a method by which it is melt by arc discharge (arc furnace) and poured into the copper casting mold, or a sintering method by the hot press, and it may be allowable when a die appropriate for the target T of the film formation apparatus shown in FIG. 4, is formed. For example, when an example of the metal glass including Fe in the main component is shown, the target of $Fe_{56}Co_7Ni_7Zr_8Nb_2B_{20}$ series metal glass is manufactured by the sintering method by the hot press. In this case, initially, the elements of Fe, Co, Ni, Zr, Nb, are prepared as in the composition rate, melted carefully in the arc furnace, and mixed. After melting them, they are cooled enough, reversed, and melted again and mixed. Such a process is repeated several times, and they are melted sufficiently so that there is no melting unevenness. After that, they are cooled and taken out, and pulverized into powders. After that, combined with B(boron) according to the composition rate, melted by the hot press, and it is baked and hardened into an arbitrary target shape. Besides, in $Pd_{76}Cu_6Si_{18}$ series metal glass, only when Pd, Cu, Si are melted carefully, the target can be obtained.

A factor common to both whose examples are described is that the target manufactured by the arc furnace or hot press is a polycrystal alloy, and it is not always necessary that it is the amorphous structure (metal glass). Of course, even when the metal glass is used as the target as it is, there is no problem. In $Pd_{40}Cu_{30}Ni_{10}P_{20}$ series metal glass, because it easily has the amorphous structure, there is also a case where the target itself is the metal glass.

The target manufactured in the above manner is attached to the film formation apparatus in FIG. 4, and the spattering film formation is conducted. Although the film formation condition is different also depending on the condition forming the film layer and the apparatus, as an example, in an atmosphere of 0.5 Pa Ar, the high frequency voltage of 500 W is impressed between RF electrodes (not shown), and the distance from the target T to a sample desired to make film formation (herein, the base surface of the substrate 10 of the metallic mold) is set to 90 mm. When Ar particle of the plasma generated on the target T is corrode with the target T at high speed, the its metal particle is snapped-out, adhered to the base surface of the faced substrate 10 and accumulated, and the film layer is formed.

Although depends on the film formation apparatus, because the film formation speed is changed from almost 1 μm/h to 20 μm/h, the adjustment is suitably conducted. As the sample is brought closer, the film formation speed is more increased, however, because a problem that the particle of the formed film becomes rough, is generated, the adjustment is necessary. The amorphous state of the sample formed by this method can be confirmed when the endothermic reaction generated when the amorphous state is phase-transferred to the supercooled liquid state is observed, by using DSC (heat flux differential scanning calorimetry apparatus), or when a pattern in which a peak due to the crystal structure specific to the amorphous state is not entirely seen, is obtained, by the observation by the X-ray diffraction apparatus. In the described manner, the film of the metal glass can be formed on the base surface of the substrate 10 of the metallic mold, very easily as compared with the manufacturing method of the conventional bulk metal glass.

In such a method, the metal glass film layer is formed on the optical surface of the optical purpose metallic mold, this film layer is cut by the diamond tool, and molding transfer surface is obtained. Because the crystal structure of this film layer is amorphous, the cutting property is good, and the shape error from the desired molding transfer surface shape is not larger than ±50 nm, further, the processing time period is also about one hour per one metallic mold, and it contributes to the increase of the metallic mold shape accuracy•the shortening of the metallic mold delivery time.

EXAMPLE

The present inventor manufactured, in the above-described manner, the metallic mold for the optical element by using $Pd_{76}Cu_6Si_{18}$ series metal glass as the amorphous material of the molding transfer surface. When the surface roughness of the molding transfer surface at the time of finishing processing completion is measured, it is Ra 10 nm, and the shape error is within ±50 nm. By using this metallic mold for the optical element, the plastic lens raw material whose glass transition temperature is Tg 200° C., was molded under the molding condition of the molding resin temperature 250° C., and pressure 800 kg/cm². Even when the molding of 2000shot is conducted, the optical elements whose accuracy is good, are stably obtained, further, the surface roughness on the molding transfer surface is Ra 10 nm, and there is no change, and particularly, the change of the shape was also not seen. For the metallic mold for the optical element of the present invention, the same effect can be expected also when the glass raw material is molded.

What is claimed is:

1. A forming die for forming an optical element, comprising:

a base body;

a film layer formed on the base body and having a thickness of 0.01 to 500 mm; and a transferring surface for transferring and forming an optical surface of the optical element, the transferring surface formed on a surface of the film layer by a predetermined process and having a surface roughness Ra of 0.1 to 50 nm;

wherein the film layer is formed by the deposition of a metallic glass containing 20 mol % or more of at least one atom of Pt, Ir, Au, Pd, Ru, Rh, Fe, Co, Ni, Zr, Al, Ti, Cu, W, Mo, Cr, B, and P on the base body and the metallic glass has a glass transition temperature, a crystallization temperature higher than the glass transition temperature and a characteristic that when the metallic glass is heated between the glass transition temperature and the crystallization temperature, the metallic glass becomes softened in a vitreous state, wherein when the transferring surface forms the optical element with a plastic material having a glass transition temperature of 200° C. to 250° C., the metallic glass has a glass transition temperature of 300° C. or more and is $Pd_{40}Cu_{30}Ni_{10}P_{20}$, $Pd_{76}Cu_{18}Si_6Zr_{75}Cu_{19}Al_6$, or $Zr_{55}Cu_{30}Al_{10}Ni_5$.

2. The forming die of claim 1, wherein the film layer has a hardness Hv of 100-3000 in Vickers hardness.

3. The forming die of claim 1, wherein the film layer is formed on the base body by a spattering process, an ion plating process, a deposition process, or a chemical vapor deposition process.

4. The forming die of claim 1, wherein the predetermined process is a cutting process, a heating pressing process or a combination of the cutting process and the heating pressing process.

5. The forming die of claim 1, wherein the transferring surface maintains the surface roughness after the transferring surface is heated to a temperature which is higher 50° C. higher than the glass transition temperature (Tg) of the material of the optical element formed by the transferring surface and lower than the glass transition temperature of the metallic glass.

6. A forming die for forming an optical element, comprising:
a base body;
a film layer formed on the base body and having a thickness of 0.01 to 500 mm; and
a transferring surface for transferring and forming an optical surface of the optical element, the transferring surface formed on a surface of the film layer by a predetermined process and having a surface roughness Ra of 0.1 to 50 nm;
wherein the film layer is formed by the deposition of a metallic glass containing 20 mol % or more of at least one atom of Pt, Ir, Au, Pd, Ru, Rh, Fe, Co, Ni, Zr, Al, Ti, Cu, W, Mo, Cr, B, and P on the base body and the metallic glass has a glass transition temperature, a crystallization temperature higher than the glass transition temperature and a characteristic that when the metallic glass is heated between the glass transition temperature and the crystallization temperature, the metallic glass becomes softened in a vitreous state,
wherein when the transferring surface forms the optical element with a glass material having a low melting point, the metallic glass has a glass transition temperature of 300° C. or more and is $Pd_{40}Cu_{30}Ni_{10}P_{20}$, $Pd_{76}Cu_{18}Si_6Zr_{75}Cu_{19}Al_6$, or $Zr_{55}Cu_{30}Al_{10}Ni_5$.

7. A forming die for forming an optical element, comprising:
a base body;
a film layer formed on the base body and having a thickness of 0.01 to 500 mm; and
a transferring surface for transferring and forming an optical surface of the optical element, the transferring surface formed on a surface of the film layer by a predetermined process and having a surface roughness Ra of 0.1 to 50 nm;
wherein the film layer is formed by the deposition of a metallic glass containing 20 mol % or more of at least one atom of Pt, Ir, Au, Pd, Ru, Rh, Fe, Co. Ni, Zr, Al, Ti, Cu, W, Mo, Cr, B, and P on the base body and the metallic glass has a glass transition temperature, a crystallization temperature higher than the glass transition temperature and a characteristic that when the metallic glass is heated between the glass transition temperature and the crystallization temperature, the metallic glass becomes softened in a vitreous state,
wherein when the transferring surface forms the optical element with a glass material having a glass transition temperature of 400° C. to 500° C., the metallic glass has a glass transition temperature of 500° C. or more and is $Fe_{56}Co_7Ni_7Zr_8Nb_2B_{20}$, $Co_{56}Fe_{14}Zr_{10}B_{20}$, or $Co_{51}Fe_{21}Zr_8B_{20}$.

* * * * *